US010187416B2

(12) United States Patent
Bott

(10) Patent No.: US 10,187,416 B2
(45) Date of Patent: *Jan. 22, 2019

(54) DEVICE ACTIVITY AND DATA TRAFFIC SIGNATURE-BASED DETECTION OF MOBILE DEVICE HEALTH

(71) Applicant: Seven Networks, LLC, Marshall, TX (US)

(72) Inventor: Ross Bott, San Carlos, CA (US)

(73) Assignee: Seven Networks, LLC, Marshall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/714,493

(22) Filed: Sep. 25, 2017

(65) Prior Publication Data

US 2018/0027008 A1 Jan. 25, 2018

Related U.S. Application Data

(63) Continuation of application No. 14/847,697, filed on Sep. 8, 2015, now Pat. No. 9,800,600.

(60) Provisional application No. 62/047,471, filed on Sep. 8, 2014.

(51) Int. Cl.
H04L 29/06 (2006.01)

(52) U.S. Cl.
CPC ........ *H04L 63/1425* (2013.01); *H04L 63/145* (2013.01); *H04L 63/1416* (2013.01)

(58) Field of Classification Search
CPC .................. H04L 63/1416; H04L 63/1425
USPC ........................................................... 726/1
See application file for complete search history.

(56) References Cited

U.S. PATENT DOCUMENTS

| 8,495,743 | B2* | 7/2013 | Kraemer | G06F 21/554 726/22 |
| 9,413,839 | B2 | 8/2016 | Annan et al. | |
| 2006/0026679 | A1 | 2/2006 | Zakas | |
| 2006/0239219 | A1 | 10/2006 | Haffner et al. | |
| 2009/0141634 | A1 | 6/2009 | Rothstein et al. | |
| 2011/0167474 | A1 | 7/2011 | Sinha et al. | |
| 2014/0157352 | A1 | 6/2014 | Paek et al. | |
| 2015/0271199 | A1* | 9/2015 | Bradley | H04L 63/1441 726/25 |

* cited by examiner

*Primary Examiner* — Anthony D Brown
(74) *Attorney, Agent, or Firm* — NK Patent Law

(57) ABSTRACT

The subject matter described herein includes methods, systems, and computer program products for data traffic signature-based detection and protection against malware. According to one method, data traffic and behavior associated with a computing device is monitored and a device activity signature is created that includes an abstraction of the data traffic. A classification of the device activity signature is determined and a policy decision for the computing device is applied based on the determined classification.

20 Claims, 2 Drawing Sheets

DEVICE ACTIVITY AND DATA TRAFFIC SIGNATURE-BASED DETECTION OF MOBILE DEVICE HEALTH

CROSS REFERENCE TO RELATED APPLICATION

This application is a continuation of U.S. patent application Ser. No. 14/847,697 entitled "DEVICE ACTIVITY AND DATA TRAFFIC SIGNATURE-BASED DETECTION OF MOBILE DEVICE HEALTH", filed on Sep. 8, 2015, which claims benefit of and priority to U.S. Provisional Patent Application No. 62/047,471 entitled "DEVICE ACTIVITY AND DATA TRAFFIC SIGNATURE-BASED DETECTION OF MOBILE DEVICE HEALTH", which was filed on Sep. 8, 2014, the content of each of the aforementioned applications is incorporated by reference herein in its entirety.

BACKGROUND

Field of the Invention

The disclosure relates to methods to monitor and maintain mobile device health, including malware detection and protection. These methods focus on a device activity and data traffic signature-based approach to detecting and protecting against undesirable execution of applications on mobile communication devices, as well as correcting other conditions which reflect suboptimal device performance.

Description of Related Art

Applications executing on a mobile device provide a continuous source of information which can be used to monitor and characterize overall "device health," which in turn can impact the device's ability to execute applications with maximum efficiency and user quality of experience (QoE). Information which can characterize device health includes most aspects of the wireless traffic to and from the device, as well as state and quality of the device's wireless radios, status codes and error messages from the operating systems and specific applications, CPU state, battery usage and user-driven activity such as turning screen on, typing, etc. Once a model is developed for what expected device activity is, deviations from this model can be used to alert the user about possible threats (e.g. malware), or to initiate automatic corrective actions when appropriate.

One example of applications that can impact device health is malware. Malware is malicious software that is designed to damage or disrupt a computing system, such as mobile phone. Malware can include a virus, a worm, a Trojan horse, spyware, or a misbehaving application.

Traditional malware detectors develop code signatures for specific malware and use this signature to match against code which has or is about to be downloaded onto a device. Signature-based malware detectors, however, depend on receiving regular signature updates in order to protect against new malware. Code signature-based protection is only as effective as its database of stored signatures.

Another type of malware detector is an anomaly-based detection system is a system for detecting computer intrusions and misuse by monitoring system activity and classifying it as either normal or anomalous. The classification is based on heuristics or rules, rather than patterns or signatures, and attempts to detect any type of misuse that falls out of normal system operation. This contrasts with code signature based system which can only detect attacks for which a code signature has previously been created.

Anomaly-based intrusion detection also has some shortcomings, namely a high false positive rate and the ability to be fooled by a correctly delivered attack.

Accordingly, a need exists for malware protection that is both dynamic and accurate. Namely, malware protection that does not rely on determining, updating, or matching code signatures and avoids a high false positive rate. At the same time, there is a need for methods to automatically detect and correct suboptimal conditions on devices that cannot be attributed to a specific piece of malware.

BRIEF SUMMARY

According to one embodiment of the present invention, a method for data traffic signature-based malware protection is disclosed. The method includes monitoring data traffic and behavior associated with a computing device. A device activity signature of the data traffic is created that includes an abstraction of the data traffic. A classification of the traffic signature is determined and a policy decision is applied based on the determined classification.

According to another embodiment, a system for data traffic signature-based malware protection includes a processor and a memory of a computing device configured for storing and executing functionality expressed as modules. A monitoring module is configured to monitor data traffic and behavior associated with the computing device. A device activity module is configured to create a device activity signature of the data traffic that includes an abstraction of the data traffic. A policy decision module configured to determine a classification of the device activity signature and to apply a policy decision for the computing device based on the determined classification.

DETAILED DESCRIPTION

Figure 1:
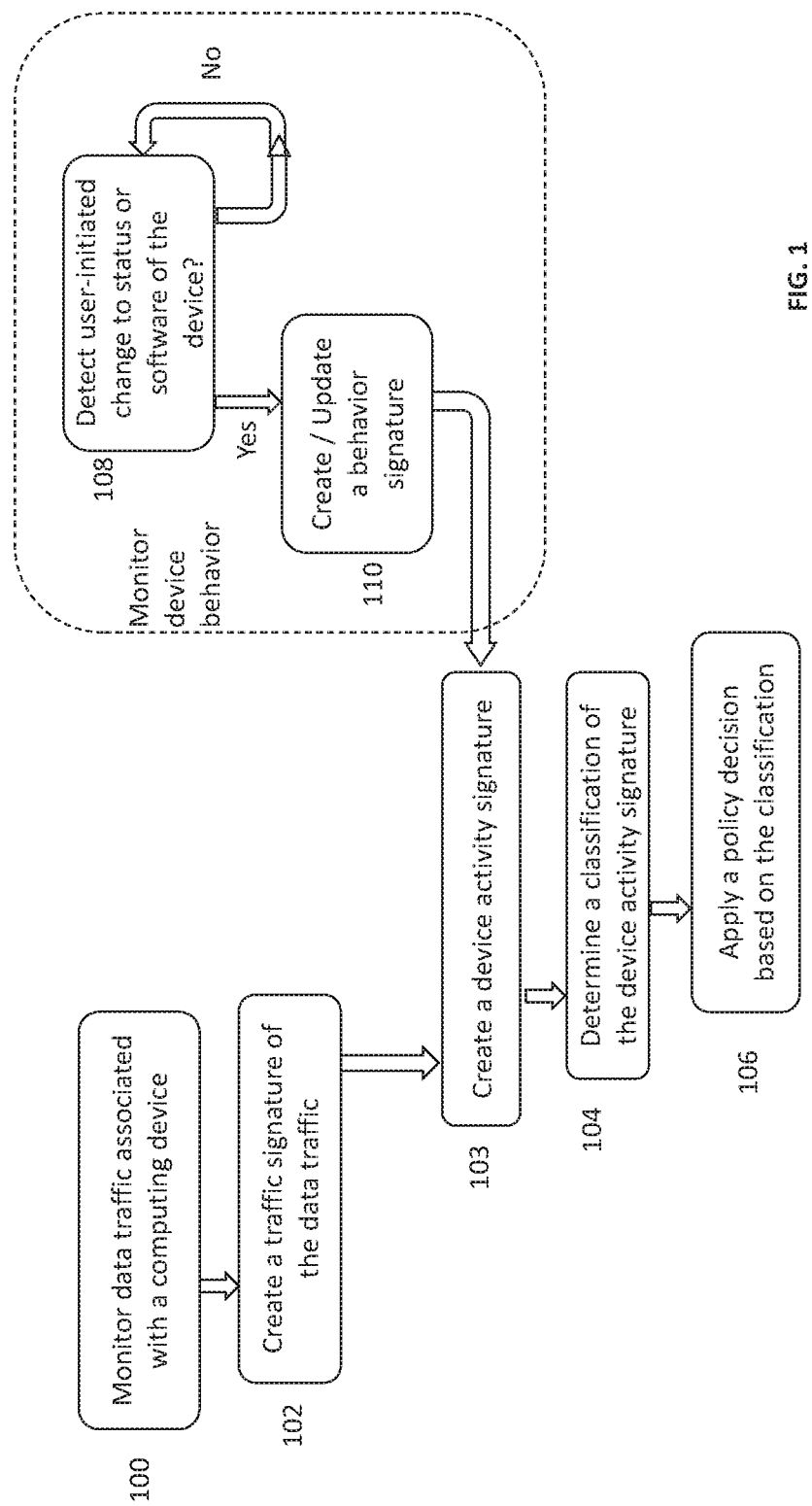
FIG. 1 is a flow diagram illustrating an example of a process for performing data traffic signature-based malware protection according to an embodiment of the subject matter described herein.

The subject matter described herein includes data traffic signature-based malware protection. In contrast to conventional configurations which use code signatures for identifying and protecting against malware, the present disclosure includes device activity signature-based detection and protection against malware.

For example, all code, whether it be malware, well-intentioned code that is acting badly unbeknownst to the user, or code which is acting normally, can be represented by an abstraction of the data traffic which the code creates over time when it executes. This abstraction can be translated into a device activity signature associated with a particular computing device, such as a mobile phone. This device activity signature can then be compared with other similar devices or with future device activity signatures from the same device.

The nature and degree of difference between one device activity signature and a reference device activity signature can then be used to apply a policy decision for the device. Applying a policy decision can include defining an event trigger and a paired action. The event trigger can include, for example, an anomalous rise in data traffic associated with malware or opening an unexpected communications port. The paired action for each event trigger can be different depending on the seriousness of the triggered event. For example, the paired action can range from noting the event in a log file to the immediate blocking of all activity associated with an application.

The device activity signature can be updated as new applications or usage patterns are associated with the device. Dynamically updating the device activity signature allows for a more refined classification of device activity as either normal or anomalous, which can help to eliminate false positives. Changes in traffic patterns which potentially cause event triggers may be "expected changes," and therefore not indicative of anomalous activity/malware. For example, a download of a new known application may generate an additional traffic pattern that is incorporated into the device activity signature. By considering application downloads initiated by the user, traffic pattern changes caused by these applications may not trigger an associated policy action.

Another example of an expected change in traffic pattern which may be accounted for by the traffic signature includes an increase in traffic associated with a specific application that is correlated with increased user screen time for that application. When a user is using a new application and the screen is on, activity generated by that application may be much less likely to be indicative of malware. Yet another example of an expected change in traffic pattern, which may be accounted for by the traffic signature, includes a gradual increase in traffic over time from an application. Gradual increases in traffic may be much less likely to be associated with malware than a sudden and significant increase in traffic. Yet another example of an expected change in traffic pattern, which may be accounted for by the traffic signature, includes new types of activity, such as the use of a new port by an application. Many non-malware applications utilize certain ports and, therefore, even a sudden use of a previously unused port may not be indicative of malware.

The malware detection described herein can be used in conjunction with, and complementary to, code signature-based methods for device protection. While code signature-based methods aim to catch and block malware before it is executed, the present subject matter can detect and prevent abnormal code behavior using detected traffic patterns after the code has executed.

With reference now to FIG. 1, at step 100 data traffic associated with a computing device is monitored. The data traffic can be monitored by data collection software installed on the computing device. Alternatively, device activity data normally recorded by the device can be collected. Many types of device activity may be automatically recorded by an operating system associated with the device and stored in counters, logs, or system files. Device activity information may be copied, extracted, parsed, or otherwise obtained from these sources for creating a traffic signature for the device.

At step 102, a traffic signature is created for the data traffic. The traffic signature is an abstraction of the data traffic created by code over time when it executes. Traffic signatures are not precise specifications of traffic, as there may be variability across devices and across time. Traffic signatures can characterize all traffic from a device or traffic from one or more individual applications on the device. Examples of applications which may generate data traffic include Facebook, Outlook, and Google Cloud Messenger. Applications can include both downloaded and embedded applications. Components of a traffic signature can include various traffic metrics such as a volume of traffic (e.g., measured in bytes), a volume of connections (e.g., measured in total number of connections), application errors (e.g., including error type and total number of errors). Traffic signature components can also be expressed as a range, an average, or any other suitable method.

In one or more embodiments, metrics may include network destination, network protocol, application protocol, IP port, patterns in the content of the transmission, device location, network technology in use, application transmitting or receiving the data, combinations thereof, or one of these characteristics individually.

At step 103, a device activity signature is created. As will be discussed in greater detail below, the device activity signature may include a behavior signature in combination with the traffic signature of the mobile device. The traffic signature may be based on monitored data traffic while the behavior signature may be based on non-traffic data such as statuses of the device (e.g., backlight on/off), the OS (e.g., CPU utilization), and the apps (e.g., number of application errors).

At step 104, a classification of the device activity signature is determined. For example, the device activity signature may be compared with a reference device activity signature and classified as either normal or anomalous based on the comparison. In addition to classifying the device activity signature as either normal or anomalous, other suitable classifications can be determined.

Classifying the device activity signature can include determining a degree of similarity or a degree of difference between the device activity signature and a reference device activity signature. A reference signature can be a device activity signature based on a population of devices similar to the computing device or a device activity signature associated with the computing device at a previous time. For example, a reference device activity signature may be based on a population of phones that share similar model, cellular carrier, operating system, and/or geographic location as the computing device. Mathematical modeling can be used to determine a degree of similarity between the individual device activity signature of the computing device and the aggregated reference device activity signature from a population of multiple similar devices. Alternatively or additionally, the device activity signature can be compared with past device activity signatures for the same device. The device activity signature for the device may be obtained at various points in time (e.g., regular intervals) and saved for later comparison. For example, a sudden or dramatic change in the device activity signature of the device without a corresponding change to the status or software of the device which might explain the change in the device activity signature may be indicative of malware. In the event that the device's device activity signature is very different from other similar devices but is consistent with itself over time, this may mitigate against classifying the device activity signature as anomalous.

By comparing accurate, refined, and dynamically updated device activity signatures with various reference device activity signatures, the subject matter herein efficiently captures anomalies and minimizes false positives. First, additional behavioral information can be used to adjust expectations as to what is normal and what is an anomaly. Second, aggregation of similar application mixes on similar devices can be used to create and refine the device activity signature. Traffic or connection interval patterns can also be used to capture anomalies and minimize false positives. Mobile-cloud traffic, for example, typically includes a client-side application that periodically with a server-side application to check for new information (e.g. getting Facebook updates, email updates, news updates, etc.). These connections may follow regular patterns, and deviations from these patterns can signal potential threats to the device.

Behavioral information can be used to determine the classification of a device activity signature. For example, screen on time within a particular application can be used to scale up a device activity signature (e.g., because increased screen on time may show increased usage of that application, likely implying higher traffic). Another example of using behavioral information includes analyzing screen on time aggregated across all device use, which may suggest a more active user overall. Traffic expectations can be adjusted accordingly. Yet another behavioral example includes factoring day/peak usage versus sleep time usage. Some background traffic may be communicated while the device is operating a sleep mode, but it may be less volume and of a different character than when the device is operating in an active mode (e.g., daytime when the user is likely to be awake). Changes due to traveling, such as changes in time zone, can also be included in the calculation of the traffic signature by including the local time. Behavioral information can also include determining whether the device is using Wi-Fi or radio cell. Traffic behavior may vary significantly depending on whether the device is using Wi-Fi or cellular radios (e.g. much more streaming is typical under Wi-Fi), and the traffic abstraction model may be adjusted to reflect these two environments.

Deeper knowledge of traffic patterns of certain high frequency applications can also be used to determine the classification of a traffic signature by looking for patterns and anomalies in the traffic and factoring out normal traffic. For example, using knowledge from other devices can be used to greatly speed up the effectiveness of understanding the traffic patterns of a new device. The device activity signature of aggregation of similar application mixes on similar handsets can help to create the device activity signature. For example, the subject matter described herein may be installed and executed across a population of devices. Device activity signatures for the population may be uploaded using a cloud-based aggregation of data. The collective intelligence (e.g., traffic signatures, device application make up, models, CPU power and other device features, etc.) can be made available to increase the overall efficiency of data collection and abstraction of device signatures, and to increase the accuracy of applying those signatures to monitor future traffic. Activity information about similar devices can greatly increase the speed and accuracy of device activity signature model.

In one embodiment, the computational load associated with creating a device activity signature and classifying the device activity signature can be divided between the client device and a server device. Offloading some of the processing performed by the client device may minimize the power impact on the device, which may be important for mobile devices with limited CPU and battery power.

At step 106, a policy decision is applied based on the classification. Applying the policy decision can include, for example, logging the monitored data traffic, providing an alert to a user, or preventing an application or service from being executed by the computing device.

In addition to steps 100-102 which relate to monitoring data traffic and creating a traffic signature, device behavior may also be monitored for creation of a behavior signature. The device activity signature may incorporate aspects of both the traffic signature and the behavior signature. For example, the device activity signature can be updated to incorporate an expected device activity signature based on user-initiated changes to applications installed on the computing device. At step 108, for example, it is determined whether a user-initiated change to the status or software on the device has been detected. If a change is detected, the behavior signature is updated at step 110. For example, if the user has installed a new application on the device, such as a video streaming application, the traffic signature can be updated to include an expected rise in traffic volume associated with the video streaming application so as to not produce a false positive classification of the signature as anomalous (e.g., indicative of malware). This may prevent an unwanted policy decision from being applied to the newly installed application, such as disabling its normal, expected, and user-desired video streaming functionality.

Figure 2:
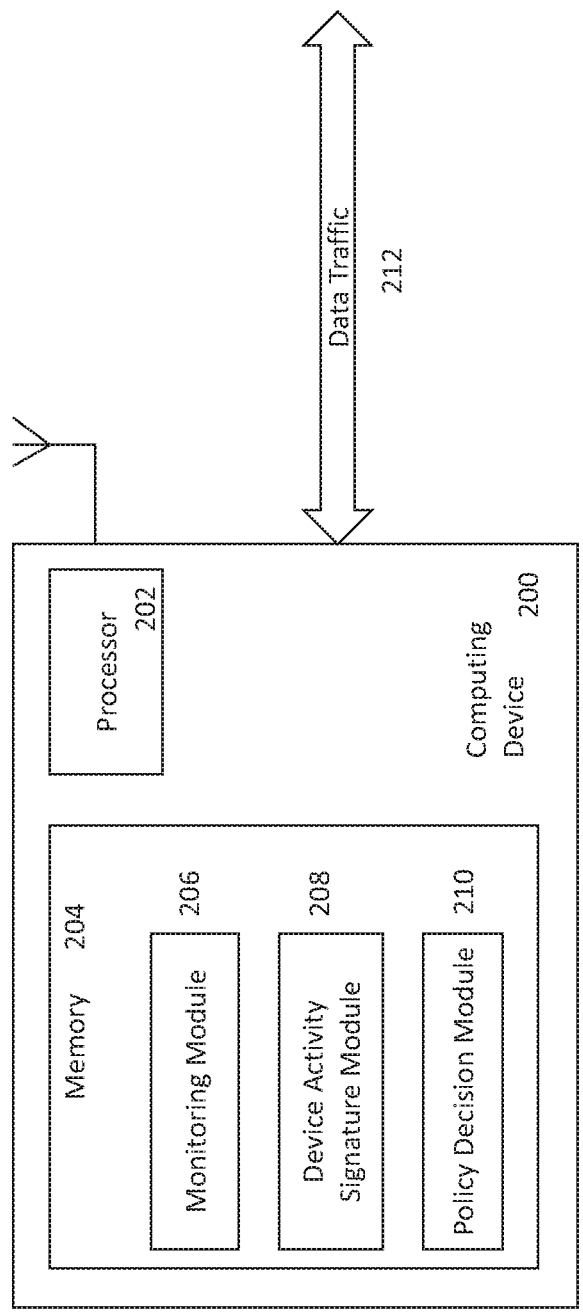
FIG. 2 is a block diagram illustrating an example of a computing device suitable for performing data traffic signature-based malware protection according to an embodiment of the subject matter described herein.

With reference now to FIG. 2, computing device 200 may include a processor 202 and a memory 204. Executable code stored on memory 204 may be executed by processor 202. Memory 204 may include various functional modules including a monitoring module 206, a device activity module 208, and a policy decision module 210.

Monitoring module 206 is configured to monitor data traffic 212 associated with a computing device. As described herein, in contrast to conventional configurations which use code signatures for identifying and protecting against malware, the present disclosure uses data traffic signature. Monitoring module 206 can include data collection software installed on the computing device 200. Device activity data normally recorded by the device can also be collected by monitoring module 206. Device activity data can be stored in counters, logs, or system files (not shown) and device activity information may be copied, extracted, parsed, or otherwise obtained from these sources by monitoring module 206 for creating a traffic signature for the device 200.

Traffic signature module 208 is configured to create a traffic signature of the data traffic that includes an abstraction of the data traffic. As described herein, the traffic signature may include a mathematical representation, abstraction, or model of the data traffic 212 associated with device 200. Functionality of device activity module 208 may be located entirely on computing device 200 or may be partially offloaded to a server (not shown) in order to reduce the power consumption of device 200.

Policy decision module 210 is configured to determine a classification of the device activity signature and to apply a policy decision for the computing device based on the determined classification. For example, policy decision module 210 may compare the device activity signature with a reference device activity signature. If the device activity signature is sufficiently different from the reference device activity signature (e.g., larger that a predetermined threshold value), then the policy decision module 210 may classify the traffic signature as anomalous. Conversely, if the device activity signature is sufficiently similar from the reference device activity signature (e.g., less that a predetermined threshold value), then the policy decision module 210 may classify the device activity signature as normal. Policy decision module may then apply a policy decision for the computing device based on the determined classification. Examples of policy decision actions can include can noting the event in a log file to the immediate prevention/blocking of all activity associated with an application.

As used herein, the device activity signature may include a behavior signature in combination with the traffic signature of the mobile device. A behavior signature may be distinguished from a traffic signature based on the input data used to create the signature. For example, a traffic signature is associated with wireless traffic where the only data points used for characterizing the traffic are the wireless traffic (i.e., packets) itself. In contrast, a behavior signature is associated with a characterization of the behavior of the device which incorporates data other than wireless traffic data. For example, statuses or activity of a mobile device that may not be associated with any network traffic may include: a number of application errors, a type of application error, and an indication whether the screen is on or off and/or whether the user is engaging in other activity on the device such as typing or talking. Statuses or activity of a mobile device may also include user-initiated changes to applications installed on the computing device, such as activity associated with installing and executing a new application on the computing device. This may also include expected changes in the behavior of the device such as increased data traffic for an application that is associated with an increase in user screen time for the application, a gradual increase in the volume of the data traffic over a predetermined period of time, or use of a new communication port known to be associated with installation and execution of a user-initiated application on the computing device. Thus, a device activity signature may be based on a traffic signature in combination with other device statuses or activity, operating system activity, application activity. A device activity signature as described herein, therefore, can be used to detect threats, degradations in performance and other anomalies in device activity. It may be appreciated that threats to the device may either be solely caused by a specific malware or may caused by a combination of device, network, and application issues. The present invention is capable of detecting, classifying, and applying a policy decision to both cases.

In one example of a malware threat that is based on a combination of factors, a device might have a hardware or firmware problem which shows up under certain network conditions and certain application activity as a large increase in TCP retries due to excessive processing delays within the firmware. The device may appear to be working, but the device is generating much more traffic on the network than necessary, and thus may have a shorter than expected battery life under such conditions.

In another example of a malware threat that is based on a combination of factors, traffic patterns from apps may appear to be normal (or only slightly abnormal), but the frequency of certain application and OS status and error codes begins to rise dramatically. In this case, the status/error codes are another source of information, which may not be directly attributable to a specific misbehaving app.

A traffic signature and/or a device behavior signature may also be used to monitor the "device health" associated with one or more applications executing on the mobile device. The "device health" of a mobile device may be determined based a device behavior signature. For example, deviations which are beyond expected behavior ranges may constitute a signal of potential "declining health."

Device behavior (and the signature which is developed for a "healthy device") may include, but is not limited to: all traffic as measured by bandwidth used per application and total for the device, Size and patterns of data packets, mobile traffic as characterized by number of radio connections (aka "signaling") and time connected, application errors and status codes, device operating system errors and status codes, and retransmissions and other changes to TCP and IP packet processing.

It may be appreciated that the expected behavior ranges may change over time due to various factors. For example, factors that may affect the expected behavior range of a mobile device which indicate whether a device is healthy may include new applications that add new traffic and/or other functions on the device. New apps adding new traffic may produce changes to the expected behavior of devices. These changes may be collected over time from the population of other subscribers who use that app. Thus, when a user adds that application to their device, the expected changes/behavior signatures may already be known for that application and incorporated into the behavior signature of the user's device. Other functions on the device may include, but are not limited to: changes in network coverage (e.g., from good to poor), changes in radio type (e.g., 2G, 3G, 4G, Wi-Fi, etc.), changes in battery level (e.g. Android OS may cause some apps to change their behavior when battery is below a threshold), and whether the device is roaming or not roaming.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of providing malware protection on a mobile device, the method comprising:
   creating a traffic signature by monitoring data traffic associated with the mobile device;
   creating a behavior signature based on non-traffic data associated with the mobile device;
   and
   blocking activity associated with an application installed on the mobile device based on the traffic signature and the behavior signature.

2. The method of claim 1, wherein creating the traffic signature and the behavior signature includes collecting device and application activity data recorded by an operating system associated with the device and stored in at least one of counters, logs, and system files.

3. The method of claim 1, wherein creating the traffic signature and the behavior signature includes utilizing data collection software installed on the mobile device.

4. The method of claim 1, wherein creating the traffic signature includes characterizing at least one of: all traffic from the mobile device or traffic associated with individual applications executed by the mobile device.

5. The method of claim 1, wherein creating the traffic signature includes at least one of: a byte volume of traffic, a connection volume, a number of application errors, a type of application error, network destination, network protocol, application protocol, IP port, and patterns in content of a transmission.

6. The method of claim 1, wherein blocking activity associated with the application installed on the mobile device includes classifying the traffic signature as anomalous.

7. The method of claim 1 further comprising creating a device activity signature that includes the traffic signature and the behavior signature, and determining a classification of the device activity signature including determining one of a degree of similarity or a degree of difference between the device activity signature and a reference device activity signature.

8. The method of claim 7, wherein the reference device activity signature includes a signature associated with the mobile device at a previous time.

9. The method of claim 7, further comprising updating the device activity signature to incorporate an expected signature based on user-initiated changes to applications installed on the mobile device.

10. The method of claim 9, wherein the expected signature is associated with installing and executing a new application on the mobile device.

11. A mobile device comprising:
a radio;
a memory; and
a processor configured to perform a method of providing malware protection, the method comprising:
creating a traffic signature by monitoring data traffic associated with the mobile device;
creating a behavior signature based on non-traffic data associated with the mobile device; and
blocking activity associated with an application installed on the mobile device based on the traffic signature and the behavior signature.

12. The mobile device of claim 11, wherein creating the traffic signature and the behavior signature includes collecting device and application activity data recorded by an operating system associated with the device and stored in at least one of counters, logs, and system files.

13. The mobile device of claim 11, wherein creating the traffic signature and the behavior signature includes utilizing data collection software installed on the mobile device.

14. The mobile device of claim 11, wherein creating the traffic signature includes characterizing at least one of: all traffic from the mobile device or traffic associated with individual applications executed by the mobile device.

15. The mobile device of claim 11, wherein creating the traffic signature includes at least one of: a byte volume of traffic, a connection volume, a number of application errors, a type of application error, network destination, network protocol, application protocol, IP port, and patterns in content of a transmission.

16. The mobile device of claim 11, wherein blocking activity associated with the application installed on the mobile device includes classifying the traffic signature as anomalous.

17. The mobile device of claim 11, wherein the method further comprises creating a device activity signature that includes the traffic signature and the behavior signature, and determining a classification of the device activity signature including, determining one of a degree of similarity or a degree of difference between the device activity signature and a reference device activity signature.

18. The mobile device of claim 17, wherein the reference device activity signature includes a signature associated with the mobile device at a previous time.

19. The mobile device of claim 17, wherein the method further comprises updating the device activity signature to incorporate an expected signature based on user-initiated changes to applications installed on the mobile device.

20. A non-transitory, computer-readable storage medium storing program instructions that when executed on a mobile device cause the mobile device to perform a method of providing malware protection, the method comprising:
creating a traffic signature by monitoring data traffic associated with the mobile device;
creating a behavior signature based on non-traffic data associated with the mobile device; and
blocking activity associated with an application installed on the mobile device based on the traffic signature and the behavior signature.

* * * * *